US011244371B2

(12) United States Patent
Flannery et al.

(10) Patent No.: US 11,244,371 B2
(45) Date of Patent: Feb. 8, 2022

(54) METHODS AND APPARATUS TO TRANSLATE AND MANAGE PRODUCT DATA

(71) Applicant: Cimpress Schweiz GmbH, Winterthur (CH)

(72) Inventors: Kellen Flannery, Waltham, MA (US); David Goldman, Bedford, MA (US)

(73) Assignee: CIMPRESS SCHWEIZ GMBH, Winterthur (CH)

( * ) Notice: Subject to any disclaimer, the term of this patent is extended or adjusted under 35 U.S.C. 154(b) by 131 days.

(21) Appl. No.: 16/245,902

(22) Filed: Jan. 11, 2019

(65) Prior Publication Data
US 2019/0220914 A1    Jul. 18, 2019

Related U.S. Application Data

(60) Provisional application No. 62/617,501, filed on Jan. 15, 2018.

(51) Int. Cl.
*G06Q 30/00* (2012.01)
*G06Q 30/06* (2012.01)

(52) U.S. Cl.
CPC ..... *G06Q 30/0629* (2013.01); *G06Q 30/0621* (2013.01); *G06Q 30/0635* (2013.01)

(58) Field of Classification Search
CPC .......... G06Q 30/0601; G06Q 30/0603; G06Q 30/0623; G06Q 30/0627; G06Q 30/0629
See application file for complete search history.

(56) References Cited

U.S. PATENT DOCUMENTS

| 7,013,290 | B2* | 3/2006 | Ananian | G06Q 30/02 |
| | | | | 705/26.42 |
| 8,359,245 | B1 | 1/2013 | Ballaro et al. | |
| 2003/0023507 | A1* | 1/2003 | Jankelewitz | G06Q 30/0631 |
| | | | | 705/26.81 |

(Continued)

OTHER PUBLICATIONS

Linder, Markus, Mag Tassilo Pellegrini, and Bakk Martin Schliefnig. "The realization of Semantic Web based E-Commerce and its impacton Business, Consumers and the Economy." 2006. (Year: 2006).*

(Continued)

*Primary Examiner* — Christopher B Seibert
(74) *Attorney, Agent, or Firm* — Hanley, Flight & Zimmerman, LLC

(57) ABSTRACT

Methods and apparatus to translate and manage product data are disclosed. A disclosed example system for translating and managing product data pertaining to a plurality of tenants includes a rules executor to verify, based on product attribute rules, that requested product attributes pertaining to a product request from a buyer are valid, an attribute translator to generate platform standard attributes of products corresponding to the tenants, where the attribute translator is to translate tenant-specific product attributes to the platform standard attributes based on the tenant-specific product attributes and the product attribute rules, and an equivalency evaluator to evaluate an equivalency of the products based on the requested product attributes and output the equivalency. The equivalency evaluator is to store the equivalency.

31 Claims, 8 Drawing Sheets

(56) References Cited

U.S. PATENT DOCUMENTS

| | | | |
|---|---|---|---|
| 2003/0060913 A1* | 3/2003 | Turner | G06F 30/15 |
| | | | 700/103 |
| 2003/0182101 A1* | 9/2003 | Lambert | G06F 40/226 |
| | | | 704/1 |
| 2003/0212602 A1* | 11/2003 | Schaller | G06Q 10/087 |
| | | | 705/22 |
| 2005/0102192 A1* | 5/2005 | Gerrits | G06Q 30/0629 |
| | | | 705/26.64 |
| 2007/0192298 A1* | 8/2007 | Michalke | G06Q 30/06 |
| 2008/0060057 A1* | 3/2008 | Barchi | G06F 16/282 |
| | | | 726/3 |
| 2008/0082479 A1* | 4/2008 | Chang | G06Q 30/0629 |
| 2008/0167969 A1* | 7/2008 | Ofer | G06Q 30/0633 |
| | | | 705/26.8 |
| 2008/0215349 A1* | 9/2008 | Baran | G06Q 30/0276 |
| | | | 705/1.1 |
| 2010/0030653 A1* | 2/2010 | Westphal | G06Q 30/0603 |
| | | | 705/26.1 |
| 2010/0191741 A1* | 7/2010 | Stefik | G06F 16/358 |
| | | | 707/748 |
| 2011/0142335 A1* | 6/2011 | Ghanem | G06K 9/6215 |
| | | | 382/165 |
| 2011/0258083 A1 | 10/2011 | Ren | |

OTHER PUBLICATIONS

International Searching Authority, "International Search Report and Written Opinion," issued in connection with International Application No. PCT/US2019/013507, dated Apr. 30, 2019, 12 pages.

\* cited by examiner

FIG. 6A
FIG. 6B
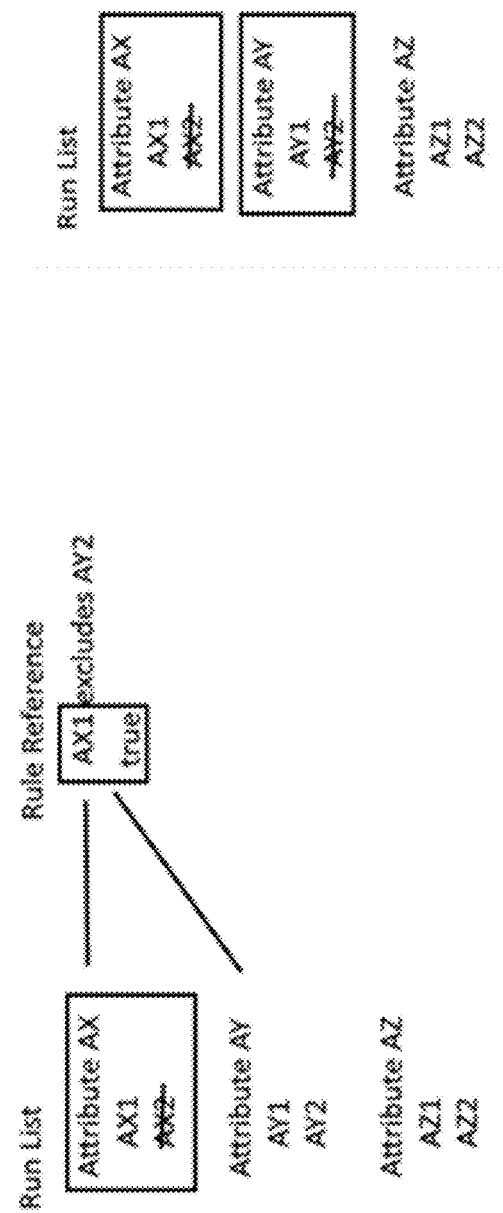
FIG. 6C
FIG. 6D

US 11,244,371 B2

METHODS AND APPARATUS TO TRANSLATE AND MANAGE PRODUCT DATA

RELATED APPLICATION

This application claims the benefit under 35 U.S.C. § 119(e) to U.S. Provisional Application No. 62/617,501 titled "METHODS AND APPARATUS TO TRANSLATE AND MANAGE PRODUCT DATA, which was filed on Jan. 15, 2018. The foregoing U.S. Application is hereby incorporated herein by reference in its entirety.

FIELD OF THE DISCLOSURE

This disclosure relates generally to product data and, more particularly, to methods and apparatus to translate and manage product data.

BACKGROUND

Numerous products are configured by users and sold from businesses on the interne. Modeling product information for these products is often very specific to a business (e.g., a company). Typically, businesses that sell the same or very similar products represent those products differently from one another within their respective internal processes or data systems. For example, one business might use stock keeping units (SKU) identifier(s) to denote a particular product in a particular color, whereas another business might use two separate identifiers, one for the base product and a second to indicate a particular color of that product. Similarly, businesses or other entities that consume or purchase such products may also have different ways of representing that same or an equivalent product.

BRIEF DESCRIPTION OF THE DRAWINGS

FIGS. 6A-6D illustrate example rules execution that may be implemented in examples disclosed herein.

In general, the same reference numbers will be used throughout the drawing(s) and accompanying written description to refer to the same or like parts.

DETAILED DESCRIPTION

Figure 1:
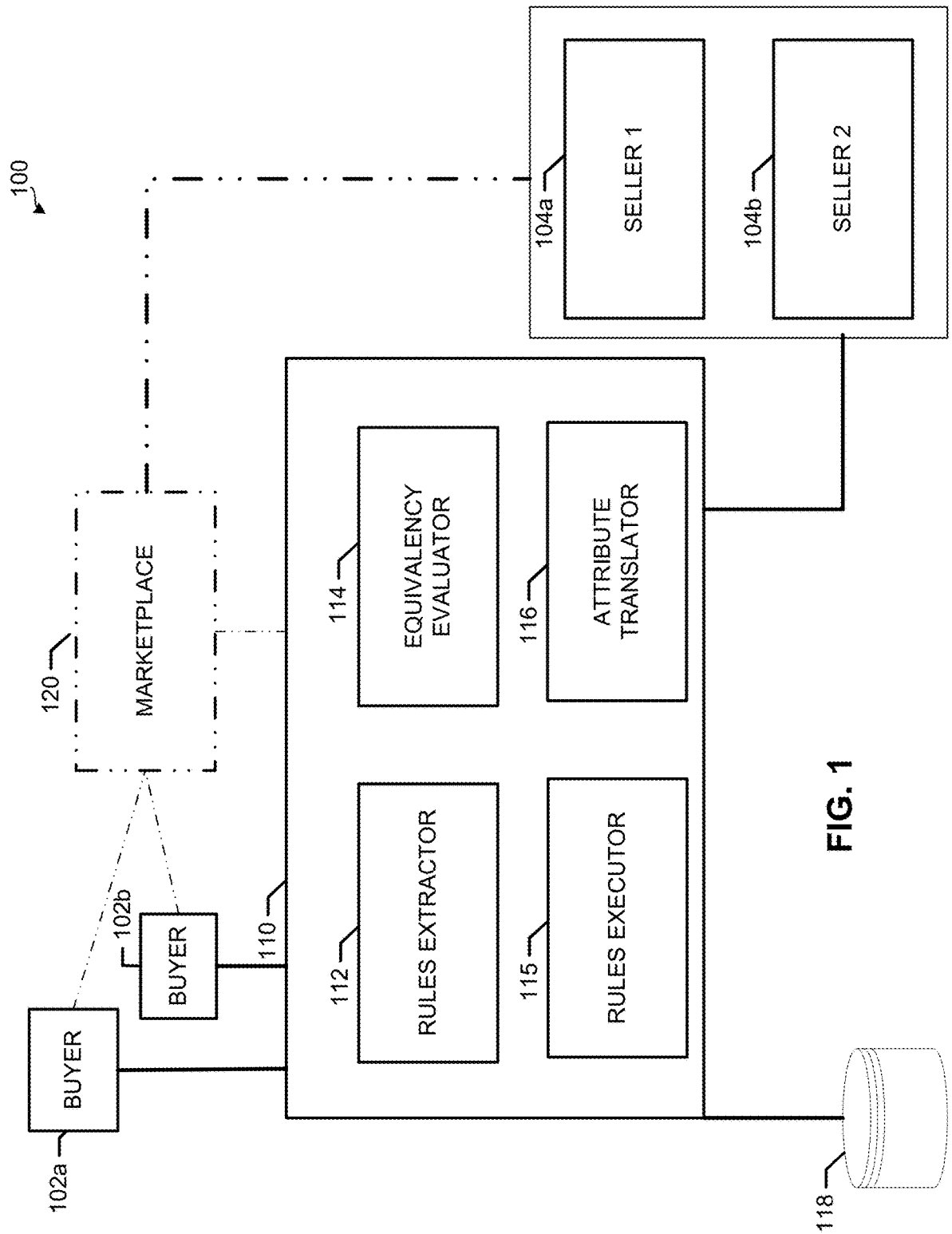
FIG. 1 is a schematic illustration of an example product data management system in accordance with the teachings of this disclosure.

Methods and apparatus to translate and manage product data are disclosed. Typically, businesses denote product configurations with designations that indicate the same or similar or information, but are described and/or attributed in different ways. This incongruous attribute identification can cause product identification (e.g., similar product identification), product fulfillment and/or comparisons to be difficult.

As used herein, different businesses or other entities (individual or entities, corporations and/or businesses, whether they are selling or buying products) are referred to as tenants within a two-sided platform of buyers and sellers. In some examples, it is assumed that every tenant represents their products differently within their internal systems or processes. In effect, the product models or the structure by which tenants catalog and characterize product information can vary with each tenant, thereby making product transactions among different tenants challenging. In some examples, product models often become more complex as they model products that are highly customizable with many variants or options associated with the products (e.g. color, size, finishing options, artwork overlays, etc.). This complexity serves to increase the challenge of transacting amongst or between different tenants.

Tenants can be viewed by modeling products along a spectrum, for example. At one end of the spectrum is a model in which each combination of attributes (e.g. customizable facets of a product such as color and size) results in a different orderable identifier, which are sometimes referred to as stock keeping units (SKUs). For example, an alphanumeric identifier, ID-123, may represent a business card product, printed in color on both sides, on matte paper with lamination and rounded corners. This can be referred to as a Fully Configured Product Identifier.

At the other end of the spectrum, the tenant can specify each customizable attribute as an input, where a single identifier is specified with numerous additional identifiers used to represent each and every option of the product, for example. At this end of the spectrum, a set of rules is typically required to govern which combinations of options may or may not be valid for ordering the products. For example, a second alphanumeric identifier, ID-ABC may represent a business card that is accompanied with numerous additional option identifiers, such as an identifier to indicate the type of printing on the front and back, an identifier to indicate the type of paper to be used, an identifier to indicate lamination should be applied, and an identifier to indicate that corners should be rounded. Accordingly, the options available for the second alphanumeric ID consist of type of printing, selectable coating/lamination, choice of paper, and corner rounding choices. A potential rule that may need to be applied may be the unavailability of a specific coating, based on the type of paper chosen. For example, when a particular very thin paper is chosen, perhaps the product cannot be ordered with lamination. This, and other examples similar to ID-ABC, are referred to as Variably Configured Product Identifiers.

Viewing product modeling as a spectrum where any product model falls somewhere between the two extremes of using Fully Configured Product Identifiers or Variably Configured Product Identifiers provides background to facilitating translations when two tenants are using different product models. Where a tenant and/or seller falls on this spectrum is often driven by the type of business and types of products being modeled.

Examples disclosed herein include methods and apparatus that enable the capture, persistence, translation, and management of data associated with a product, where a product may be a physical good or service that is sold between two or more parties (i.e. buyers and sellers). In particular, products that are highly customizable, present significant challenges for existing product information management systems (PIMs). These challenges are addressed by examples disclosed herein. Examples disclosed herein can also incorporate methods of data translation where the parties participating in a product transaction view or manage data pertaining to that product in very different ways. Examples disclosed herein enable a two-sided platform on which buyers and sellers can more easily and, at larger scales, manage product information and transact with one another.

Accordingly, examples disclosed herein enable product data translation to account for differences in identification of product attributes to facilitate product substitutions (e.g., product purchase substitutions), substitute sourcing and/or comparisons. Examples disclosed herein also enable rule pattern generation to facilitate product ordering rules to prevent configuration and/or ordering/purchasing of invalid product configurations, for example. Examples disclosed herein also enable generation of mapping and/or attributes of products lacking attributes (e.g., SKUs without product configuration information). Examples disclosed herein enable computationally efficient translation between different tenant-specific attributes within the two-sided platform to enable product equivalency determinations that can be used to facilitate product substitutions, for example.

When a tenant defines products within the aforementioned two-sided platform according to examples disclosed herein, they first define the language by which they define those products. This language, which is also referred to as a tenant definition, includes the words used to define the attributes of products as well as the data types and meanings of those words as expressed through their mapping to platform standard definitions. A platform standard definition exists within the two-sided platform as a set of highly granular attributes that span generally accepted industry standards across a wide group of existing or potential tenants. A plurality of distinct platform standard definitions exists correlating to a plurality of distinct classes of products or product types. This plurality is driven by the difference amongst product types where a product type is different by the nature of it needing different attributes to sufficiently describe it.

For example, the set of attributes needed to describe a T-shirt type product are typically very different from the attributes needed to define a postcard or business card type product. Accordingly, T-shirts may have an attribute that defines sleeve length, whereas business cards may have an attribute that defines the thickness of the paper stock used. Hence, T-shirts will have a set of attributes defined that, as a group, are different from the set of attributes used for business cards, even if some of those attributes are common between the two, such as "color," for example. These attributes are intended to be as granular as is possible/practical to enable easy and flexible mapping to less granular tenant attributes, contained within a particular tenant definition. For example, a tenant may define an attribute within their tenant definition for business cards named "Paper Type" which actually includes information that may be stored across a plurality of platform standard definition attributes such as "Paper Color," "Paper Weight," "Paper Coating," and "Paper Finish." Having a granular platform standard definition allows greater flexibility within tenant definitions to represent products in more varied and unique ways. The example below provides an example of two such platform standard definitions including the attributes defined within each.

Shown below are example product attributes:

| Platform Standard Definition: Single flat sheet products (e.g. business cards, postcards, flyers, etc.) | |
| --- | --- |
| Substrate Type | List of values (Paper, Cardboard, PVC, PET, etc.) |
| Substrate Coating | List of values (None, single side, both sides) |
| Substrate Finish | List of values (Gloss/Semi-gloss, Matte/Semi-matte, Linen, etc.) |
| Substrate Weight | Nuer (weight of substrate in gsm - grams per square meter) |
| Substrate Color | List of values (White, Black, Transparent, Yellow, etc.) |
| Substrate Thickness | Number (thickness of substrate in microns) |
| Trim Width | Number (Width of final cut sheet in centimeters) |
| Trim Height | Number (Height of final cut sheet in centimeters) |
| Printing Process | List of values (Offset, Digital Thermography, Undefined, etc.) |
| Process Color Side 1 | List of values (CMYK, CMY, K, None) |
| Process Color Side 2 | List of values (CMYK, CMY, K, None) |
| Spot Color Count Side 1 | Number (number of spot colors present on side 1) |
| Spot Color Count Side 2 | Number (number of spot colors present on side 1) |
| Surface Coating Type Side 1 | List of values (Varnish, Aqueous, UV Coating, Lacquer, None) |
| Surface Coating Finish Side 1 | List of values (Matte, Gloss, High Gloss, Soft Touch, None, etc.) |
| Surface Coating Type Side 2 | List of values (Varnish, Aqueous, UV Coating, Lacquer, None) |
| Surface Coating Finish Side 2 | List of values (Matte, Gloss, High Gloss, Soft Touch, None, etc.) |
| Etc. | |

| Platform Standard Definition: Knit Shirt (e.g. T-shirt, sweatshirt, etc.) | |
| --- | --- |
| Materials | Array/List of values (Cotton, Flax, Wool, Ramie, Silk, etc.) |
| Gender/User | List of values (Men, Women, Unisex, Youth, Baby, etc.) |
| Clothing Size | List of values (XXS, XS, S, M, L, XL, 2XL, 3XL, 0-3 months, etc.) |
| Chest Width | Number (Width in cm as measured from underarm to underarm) |

| Platform Standard Definition: Knit Shirt (e.g. T-shirt, sweatshirt, etc.) | |
|---|---|
| Body Length | Number (Length in cm as measured from neck seam to shirt bottom) |
| Number of Pockets | Number (Total number of pockets on shirt) |
| Pocket Types | Array/List of values (Flap, Slash, Patch, Inseam, etc.) |
| Pocket Placements | Array/List of values (Left Chest, Right Chest, Left Sleeve, etc.) |
| Pocket Closure Types | Array/List of values (None, Zipper, Button, Velcro, Snap, etc.) |
| Sleeve Length | List of values (Sleeveless, Short Sleeve, ¾ Sleeve, Long Sleeve) |
| Collar Type | List of values (Crew Neck, V-Neck, Turtle Neck, Y-Neck, etc.) |
| Etc. | |

The product attributes shown above illustrated different product features and/or characteristics that can be organized and/or separated based on attribute categorization. Accordingly, the attributes described above can be described in terms of tenant definitions (e.g., attribute definitions unique to specific tenants) and platform standard definitions, which may pertain to attributes used over a platform (e.g., a server, business and/or website) and/or global use.

FIG. 1 is a schematic illustration of an example product data management system 100 in accordance with the teachings of this disclosure. The product data management system 100 of the illustrated example is communicatively coupled to (e.g., via a network) buyers (e.g., a buyer web server) 102 (hereinafter 102a, 102b, etc.) and sellers 104 (hereinafter 104a, 104b, etc.) (e.g., seller web server(s)), which are designated as tenants in this example. The example product data management system 100 includes a product data analyzer system 110, which includes a rules extractor 112, an equivalency evaluator 114, a rules executor 115, an attribute translator 116 and a data storage 118. In some examples, a marketplace (e.g., a selling/purchasing interface server, etc.) 120 communicatively couples the buyers 102a, 102b with the sellers 104a, 104b.

To facilitate the sale and/or exchange of products and services between the buyers 102a, 102b and at least one of the sellers 104a, 104b, the marketplace 120 of the illustrated example serves as an intermediary in providing information related to products sold by the sellers 104a, 104b. In particular, the example marketplace 120 functions as a website and/or server to facilitate product sales between the buyers 102a, 102b and the sellers 104a, 104b. In this example, the marketplace 120, through the product data analyzer system 110, determines an availability and/or match of product(s) that are desired by at least one of the buyers 102a, 102b so that the product(s) can be fulfilled by one or more of the sellers 104a, 104b. In other words, the product data analyzer system 110 of the illustrated example acts as a two-sided platform to facilitate the aforementioned product sales.

To facilitate product data attribute translations between the sellers 104a, 104b, the example product data analyzer system 110 analyzes and translates tenant definitions and/or product rules pertaining to the sellers 104a, 104b. In particular, the attribute translator 116 of the illustrated example analyzes product attributes pertaining to the tenant definitions of the sellers 104a, 104b or the buyer(s) 102a, 102b to generate corresponding platform standard definitions. In other examples, the platform standard definitions are pre-defined.

To generate product rules (e.g., product attribute rules) of products sold by the sellers 104a, 104b, or the buyers 102a, 102b, the example rules extractor 112 analyzes product data pertaining to the sellers 104a, 104b and defines rules associated with the different products and/or product identifiers. In some examples, the rules are defined based on product attributes and/or patterns discerned from the product attributes. In other examples, the rules are manually defined (e.g., inputted by a user via a web-based interface).

To verify whether products sold by the sellers 104a, 104b have a requisite equivalence to another (e.g., the products have at least a threshold amount of the same or similar attributes) for product fulfillment purposes, the example equivalency evaluator 114 of the illustrated example is implemented to determine whether products can be substituted and/or fulfilled by the sellers 104a, 104b, where allowable substitutions can also be indicated by one of the buyers 102a, 102b by making representative electronic entries later read by the equivalency evaluator 114.

The rules executor 115 of the illustrated example applies the rules to products ordered and/or requested by the one of the buyers 102a, 102b. For example, the rules executor 115 may verify that product attributes requested by the buyers 102a, 102b are valid. In particular, this validity may be determined based on whether a requested combination of attributes from the buyers 102a, 102b are valid as a combination (e.g., an XL T-shirt in a red color, etc.).

The example data storage 118 stores tenant product attributes, data pertaining to product attributes and/or product attribute translations, standard platform definitions attributes, etc. In some examples, the attribute translator 116 directs the data storage 118 to store retrieved product attribute data (e.g., acquired during network-based retrieval processes).

While an example topology of a web server-based product purchasing marketplace (e.g., a two-sided marketplace) is shown in FIG. 1, any appropriate topology and/or arrangement facilitating product data communication may be implemented instead. For example, the product data analyzer system 110 can be integrated with the marketplace 120 in some examples.

While an example manner of implementing the product data management system 100 of FIG. 1 is illustrated in FIG. 1, one or more of the elements, processes and/or devices illustrated in FIG. 1 may be combined, divided, re-arranged, omitted, eliminated and/or implemented in any other way. Further, the example rules extractor 112, the example equivalency evaluator 114, the example rules executor 115, the example attribute translator 116 and/or, more generally, the example product data management system 100 of FIG. 1 may be implemented by hardware, software, firmware and/or any combination of hardware, software and/or firmware. Thus, for example, any of the example rules extractor 112, the example equivalency evaluator 114, the example rules executor 115, the example attribute translator 116 and/or, more generally, the example product data management system 100 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example, rules extractor 112, the example equivalency evaluator 114, the example rules executor 115, and/or the example attribute translator 116 is/are hereby expressly defined to include a non-transitory computer readable storage device or storage disk such as a memory, a digital versatile disk (DVD), a compact disk (CD), a Blu-ray disk, etc. including the software and/or firmware. Further still, the example product data management system 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic or machine readable instructions for implementing the product data management system 100 of FIG. 1 is shown in FIGS. 2, 3, 5 and 8. The machine readable instructions may be a program or portion of a program for execution by a processor such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowcharts illustrated in FIGS. 2, 3, 5 and 8 many other methods of implementing the example product data management system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

As mentioned above, the example processes of FIGS. 2, 3, 5 and 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, and (6) B with C.

Figure 2:
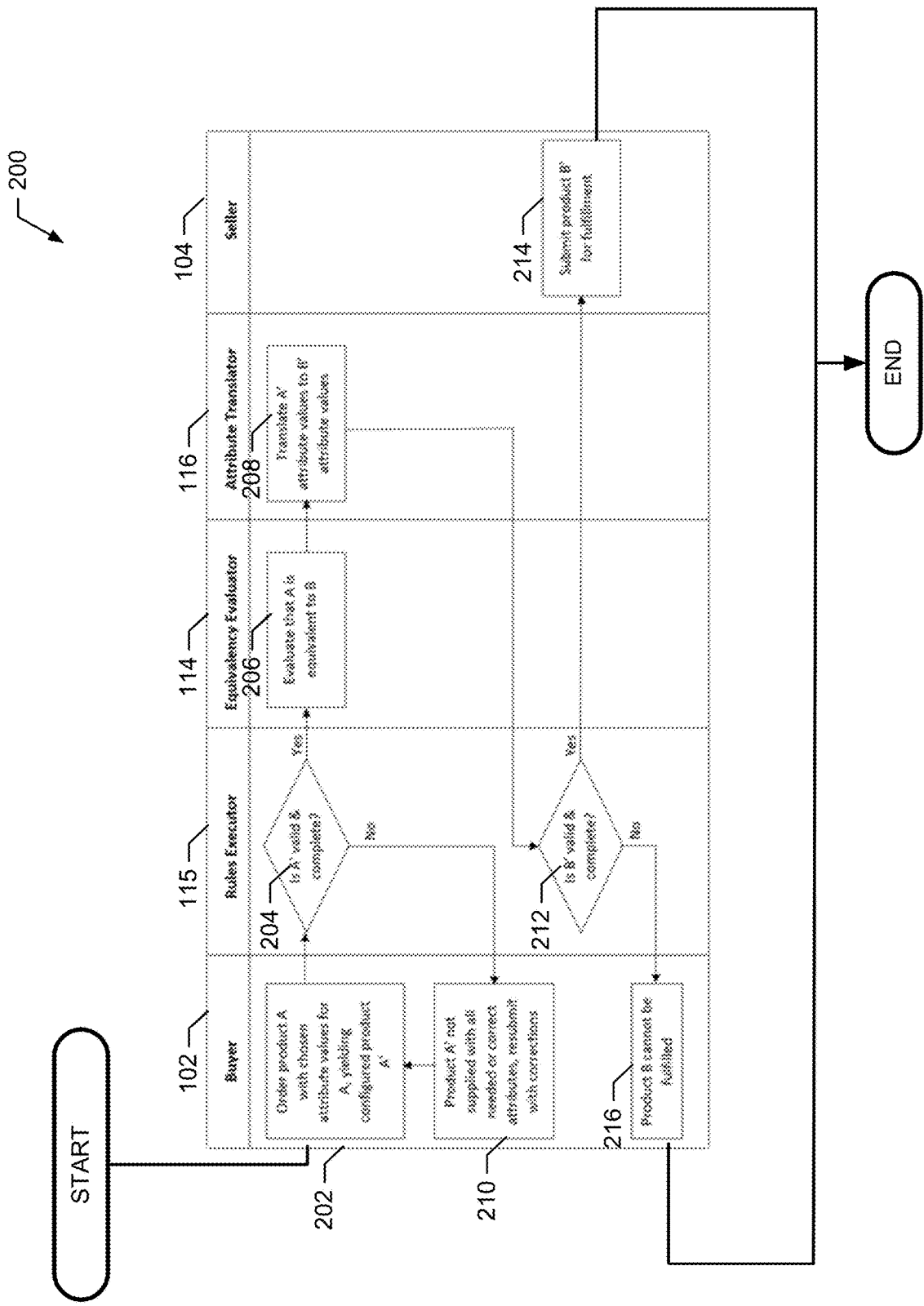
FIG. 2 is a flowchart representative of machine readable instructions that may be executed to implement the example product data management system of FIG. 1.

The example method 200 of FIG. 2 of the illustrated example may be implemented by the product data analyzer system 110 and/or, more generally, the product data management system 100 of FIG. 1. The example method 200 begins as an order (e.g., a product request) is about to be received at the product data analyzer system 110 from the buyer 102. In particular, the buyer 102 is about to issue a product order or request from a website to the marketplace 120.

In this example, the buyer 102 orders an example product A with product attribute values for A, yielding a configured product designated as A' (block 202).

According to the illustrated example, the rules executor 115 determines whether the configured product A' is valid (block 204). In this example, the rules executor 115 determines whether a combination of requested attributes is valid (e.g., size with color, conflicting attributes, etc.). If it is determined that the configured product A' is valid (block 204) control of the process proceeds to block 206. Otherwise, the process proceeds to block 210.

According to the illustrated example, if the configured product A' is determined to be invalid by the rules executor 115 (block 204), the configured product A' is not supplied or fulfilled (with needed and/or correct attributes), and the buyer 102 is directed to resubmit the product request or re-order with corrections (block 210) and control of the process returns to block 202.

In this example, if the configured product A' is valid (block 204), the example equivalency evaluator 114 evaluates whether the request product A is equivalent to a product B (e.g., an equivalent product B) that is offered by a tenant (block 206).

The attribute translator 116 of the illustrated example then translates product attributes of the configured product A' into translated B' attribute values (block 208).

Next, it is determined by the example rules executor 115 and/or the equivalency evaluator 114 as to whether the translated B' attributes are valid and complete (block 212). In particular, the example rules executor 115 verifies the validity and completeness of the translated attributes B'.

If the translated B' attributes are determined by the example rules executor 115 and/or the equivalency evaluator 114 to be valid and complete (block 212), product B' is submitted for fulfillment (block 214) and the process ends.

Otherwise, if the translated B' attributes are determined by the example equivalency evaluator 115 to be not valid and complete (block 212), product B is not fulfilled (block 216)

and the process ends. In some examples, if the product B is not fulfilled, the buyer 102 is directed to re-submit the product request or order.

Figure 3:
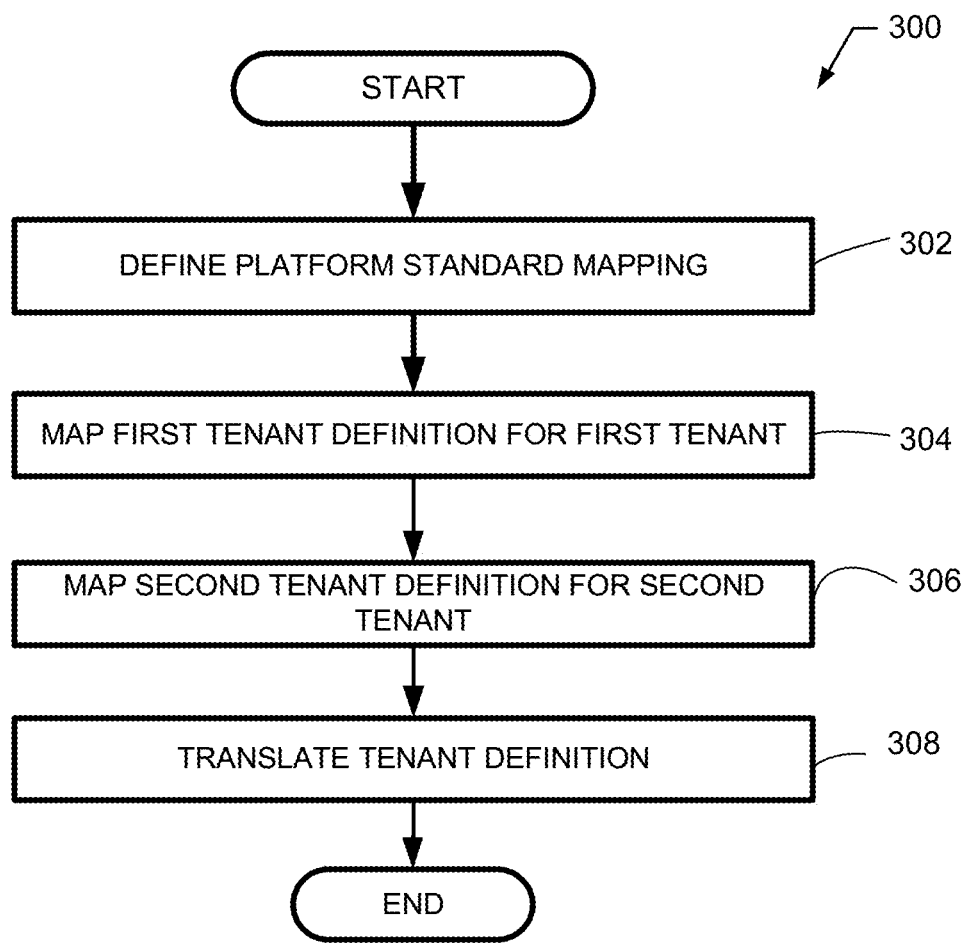
FIG. 3 is a flowchart representative of machine readable instructions that may be executed to perform attribute mapping.

Turning to FIG. 3, the example method 300 begins as two different tenants are offering similar products with different product attributes and/or organization, for which the product data analyzer system 110 is to translate and manage.

According to the illustrated example, the attribute translator 116 defines and/or generates platform standard mapping (block 302). In some examples, the attribute translator 116 defines the platform standard mapping and/or platform standard attributes based on product attributes pertaining to a first tenant (e.g., a first established tenant).

In this particular example, the attribute translator 116 maps a first tenant definition for a first tenant (e.g., the first seller 104a) (block 304).

Next, the example attribute translator 116 maps a second tenant definition for a second tenant (e.g., the second seller 104b) (block 306).

The attribute translator 116 of the illustrated example translates tenant definitions or attributes received based on the mapped first and second tenant definitions (e.g., translations of the first and second tenant definitions) (block 308).

Figure 4A:
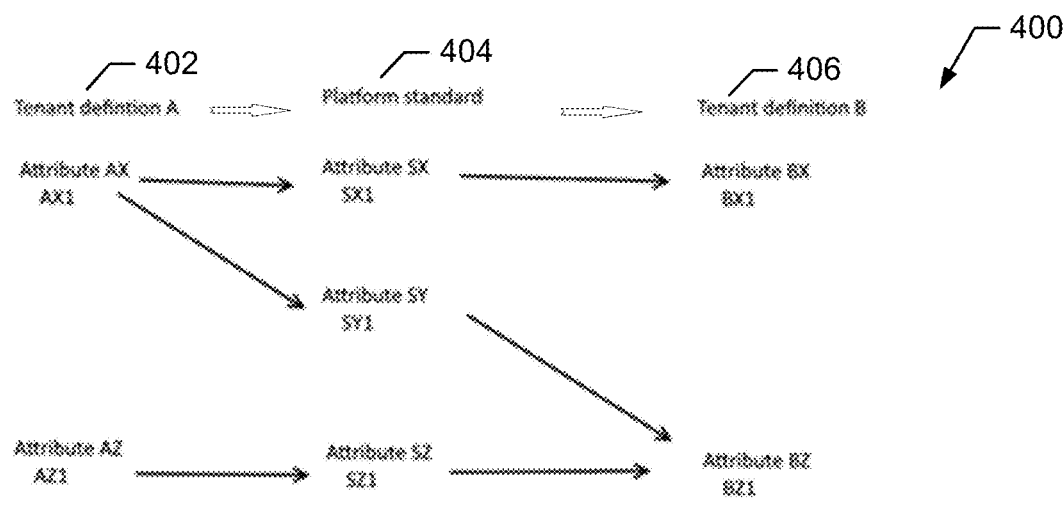
FIG. 4A illustrates example attribute mapping that may be implemented in examples disclosed herein.

FIG. 4A illustrates example attribute mapping 400 that may be implemented in examples disclosed herein. As can be seen in the example of FIG. 4A, a first tenant definition A 402, a platform standard definition 404 and a second tenant definition B 406 are shown.

In operation, the first tenant definition A 402 is translated by the attribute translator 116 to at least one representation of the platform standard 402, for example. In turn, the platform standard 404 is translated to the second tenant definition B 406. In particular, with mappings well-defined between tenant definitions and platform standard definitions, translations can be facilitated between different tenants such as, for example, tenants A and B.

With a tenant definition created, tenants may then define products based on that tenant definition, where such products may not use or support every attribute value defined within the tenant definition.

Each attribute value in tenant definition A can be translated into the definition's specified platform standard attribute value(s). This collection of platform standard attribute values can, therefore, be used to identify and translate into the target tenant definition B's attribute values.

In this example, tenant definition A contains an attribute AX with an attribute value of AX1, that maps to platform standard attribute SX's attribute value SX1.

Tenant definition B contains an attribute BX with an attribute value of BX1, that maps to platform standard attribute SX's attribute value of SX1.

According to the illustrated example, translating an attribute specified in tenant definition A of AX1 to the standard attribute value SX1 will allow examples disclosed herein to translate to BX1 in tenant definition B.

Examples disclosed herein enable the originating tenant definition to specify multiple standard definition values from a single attribute, or the destination tenant definition to have multiple standard definition values in a single attribute.

Tenant definition A has an attribute AX with an attribute value of AX1, that maps to platform standard attribute SX's attribute value SX1, as well as platform standard attribute SY's attribute value SY1. Tenant definition A also has an attribute AZ with attribute value AZ1 mapped to platform standard attribute SZ's SZ1 value.

Tenant definition B has an attribute BX with an attribute value of BX1 mapped to platform standard attribute SX's SX1 value. Tenant definition B also has an attribute BZ with a value of BZ1 mapped to standard attribute SY's SY1 value and standard attribute SZ's SZ1 value.

The example of FIG. 4A is able to translate tenant definition AX1 and AZ1 into standard values SX1, SY1 and SZ1. Those can be further translated into tenant definition B's BX1 and BZ1 values.

Figure 4B:
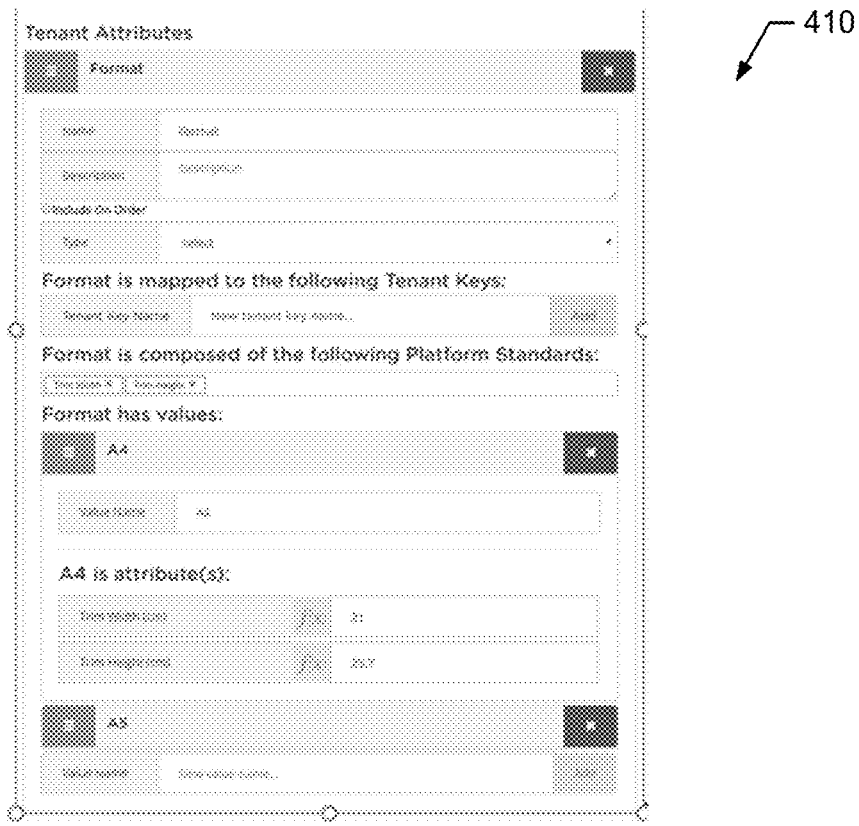
FIG. 4B illustrates an example user interface that may be implemented in examples disclosed herein.

FIG. 4B illustrates an example user interface 410 that may be implemented in examples disclosed herein. In some examples, the user interface 410 is implemented to enable a user to input product attributes and/or organize product attributes. Additionally or alternatively, the user interface 410 is used to define product attribute hierarchies and/or logic structures.

In this example, based on platform standard definitions, tenants can define tenant definitions that provide a further layer of definition. The user interface 410 exemplifies one such definition in which a tenant has defined a tenant attribute named "Format" that maps to the platform standard attributes of "Trim Width" and "Trim Height." Accordingly, in this example, when a value of "A4" is defined, the corresponding values for Trim Width and Trim Height are indicated in centimeters as 21 and 29.7, respectively.

The example user interface 410 facilitates relatively natural and intuitive definitions that are more consistent within specific businesses and/or types of businesses. In some examples, tenant definitions are defined once per product type, thereby enabling the tenant to operate (e.g., continue to operate) under their own specific product attribute model and/or system (e.g., product taxonomy system).

Figure 5:
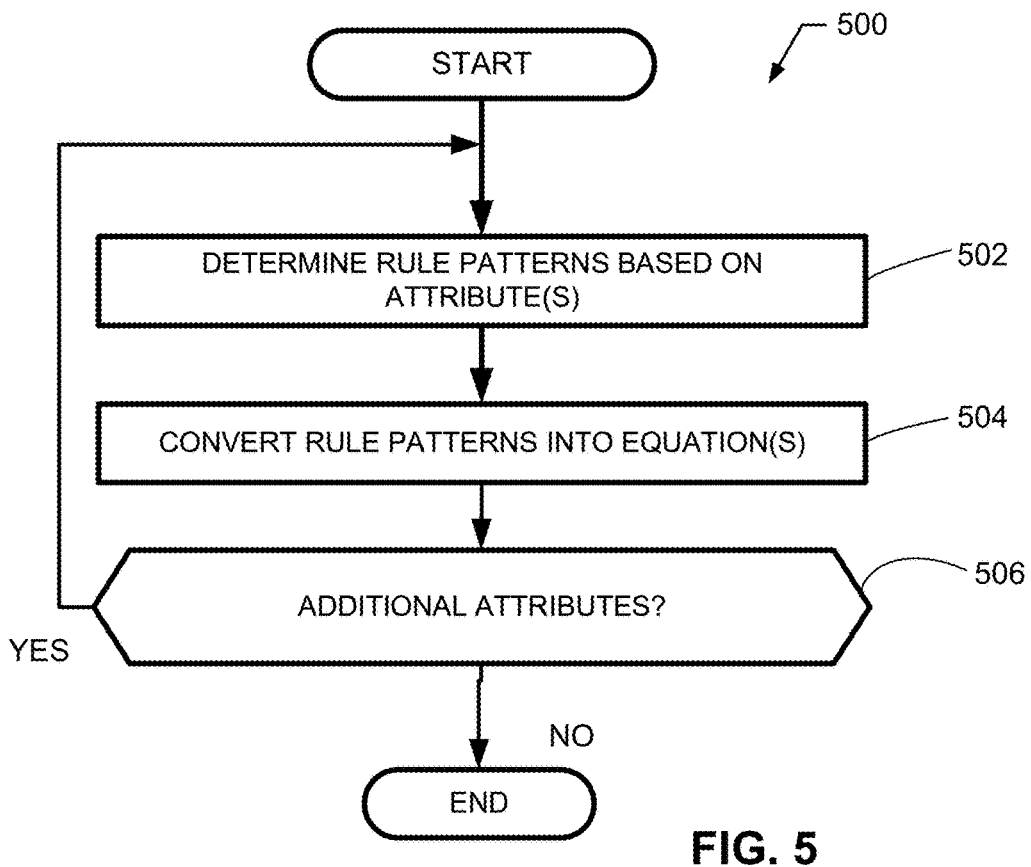
FIG. 5 is a flowchart representative of machine readable instructions that may be executed to perform rule pattern generation.

Turning to FIG. 5, the example method 500 illustrates example rule and/or rule pattern generation that may be implemented in examples disclosed herein. In particular, once a product is defined, there may be other limitations that govern the interactions between the tenant attributes of a product in that certain values of some attributes may be incompatible with certain values of other attributes. For example, when ordering a shirt with a value of Purple for the attribute of Color, the value of 3XL may not be available for the attribute of Size. Examples disclosed herein are provided to allow product rules to be specified such that the interactions between different attributes can be clearly represented and stored.

In some examples, the rules extractor 112 determines rule patterns based on attribute(s) (block 502). Additionally or alternatively, at least some of the rule patterns are manually defined by a user.

According to the illustrated example, the rules extractor 112 of the illustrated example converts rule patterns into corresponding equation(s) (block 504).

Next, it is determined by the example rules executor 115 as to whether additional attributes are to be analyzed in rule pattern analysis (block 506). If there are additional attributes to be analyzed (block 506), control of the process returns to block 502. Otherwise, the process ends.

Accordingly, implementation of example rules expressed as equations (e.g., logical equations) are described below. In this example, the implementation and/or generation of the rules and/or equations is performed by the example rules executor 115 and/or the rules extractor 112. In some examples, rules are represented in the format of a logical equation equal to false. In other words, in such examples, if the logical equation is not satisfied, the rule has been violated. Examples shown below illustrate a number of example rule patterns that can be converted into logical equations in examples disclosed herein.

For example, if Lamination is Matte, you cannot have Paper Weight of 300 gsm translates to the logical equation:

(Lamination=Matte) AND (Paper Weight=300 gsm)= false

Evaluating this equation, Lamination can be [Matte, Glossy, Satin] and Paper Weight can be [250 gsm, 300 gsm, 350 gsm]. If a selection is made for Lamination to be Matte it would update the possible values of Lamination to [Matte, ~~Glossy, Satin~~]. The logical equation could begin evaluating:

Initial: (Lamination=Matte) AND (Paper Weight=300 gsm)=false (true) AND (Paper Weight=300 gsm)=false An example engine uses the Logical statements:
A logical expression AND'd with true is the logical expression
A logical expression OR'd with true is true
A logical expression AND'd with false is false
A logical expression OR'd with false is the logical expression ~~(true) AND~~ (Paper Weight=300 gsm)=false (Paper Weight=300 gsm)=false In some examples, the way to ensure the equation is to ensure that Paper Weight does not equal 300 gsm, so the Paper Weight possible values would be updated to [250 gsm, ~~300gsm~~, 350 gsm]. In this way Matte has been selected, the 300 gsm option is not valid, satisfying the statement "If Lamination is Matte, you cannot have Paper Weight of 300 gsm".

The example equation ensures bidirectionality if started with a selection of 300 gsm instead of Matte. The selection of 300 gsm would update possible Paper Weights to [~~250gsm~~, 300 gsm, ~~350gsm~~], and process the equation:

Initial: (Lamination=Matte) AND (Paper Weight=300 gsm)=false (Lamination=Matte)~~AND (true)~~ =false Accordingly, for the example equation to remain accurate, one would to eliminate Matte as an option in Lamination [~~Matte~~, Glossy, Satin]. As a result, when 300 gsm is already selected, Matte is prevented from being selected and "breaking" the initial statement.

This example equation extends further when additional values are added to the attributes in the rule. For example, if Lamination is Matte or Satin, you cannot have Paper Weight of 300 gsm or 350 gsm. As a result, the logical equation is shown below:

(Lamination=Matte OR Lamination=Satin) AND (Paper Weight=300 gsm OR Paper Weight=350 gsm)=false When a selection is made, Lamination to [Matte, Glossy, Satin], the equation can process as follows:

Initial: (Lamination=Matte OR Lamination=Satin) AND (Paper Weight=300 gsm OR Paper Weight=350 gsm)=false (true ~~OR Lamination=Satin~~) AND (Paper Weight=300 gsm OR Paper Weight=350 gsm)=false Because true OR'd with anything is true, the equation can be further refined as (true OR Lamination=Satin) AND (Paper Weight=300 gsm OR Paper Weight=350 gsm)=false Because true AND'd with a logical expression is that logical expression ~~true~~ AND (Paper Weight=300 gsm OR Paper Weight=350 gsm)=false Further, because the Paper Weight section is utilized to evaluate to false to satisfy the equation, the two values being OR'd together means both values need to evaluate to false and, thus, eliminate both 300 gsm and 350 gsm from the possible values, leaving [250 gsm, ~~300gsm~~, ~~350gsm~~]. By selecting Matte with the rule in place the engine leaves 250 gsm as a possible value, effectively selecting 250 gsm, for example.

In some examples, additional attributes can be added to either side of the if statement but have a different effect on the logical equation created. Adding attributes of Color [Red, White, Blue] and Quantity [500, 1000, 2500, 5000].

If Lamination is Matte or Satin and Color is White or Blue, you cannot have Paper Weight of 300 gsm or 350 gsm or Quantities of 500 or 1000
Converts to the logical equation:

((Lamination=Matte OR Lamination=Satin) AND (Color=White OR Color=Blue)) AND((Paper Weight=300 gsm OR Paper Weight=350 gsm) OR (Quantity=500 OR Quantity=1000))=false Note that Paper Weight and Quantity are OR'd together and Lamination and Color are AND'd together. Evaluation of this equation allows the rule to make assumptions as soon as ANY of the OR'd attributes are satisfied, and all but one of the AND'd attributes are satisfied. As an example, if Matte is selected and Quantity of 500 is selected:

Lamination [Matte, ~~Glossy~~, ~~Satin~~]
Color [Red, White, Blue]
Paper Weight [250 gsm, 300 gsm, 350 gsm]
Quantity [500, ~~1000~~, ~~2500~~, ~~5000~~]
The logical equation would begin evaluation:

((Lamination=Matte OR Lamination=Satin) AND (Color=White OR Color=Blue)) AND ((Paper Weight=300 gsm OR Paper Weight=350 gsm) OR (Quantity=500 OR Quantity=1000))=false Because true OR'd with anything is still true, those portions of the equation can be eliminated:

((true OR ~~Lamination==Satin~~) AND (Color=White OR Color=Blue)) AND ((~~Paper Weight==300gsm~~ OR Paper Weight ~~Paper Weight==350gsm~~) OR (true OR ~~Quantity==1000~~))=false (true) AND (Color=White OR Color=Blue) AND (true)=false ~~(true) AND~~ (Color=White OR Color=Blue) ~~AND (true)~~ =false This leaves enough information to be acted on, Color cannot be White or Blue or the rule would be violated, eliminating the Color [Red, ~~White~~, ~~Blue~~]. This rule with those selections yields the following:

Lamination [Matte, ~~Glossy~~, ~~Satin~~]
Color [Red, ~~White~~, ~~Blue~~]
Paper Weight [250 gsm, 300 gsm, 350 gsm]
Quantity [500, ~~1000~~, ~~2500~~, ~~5000~~]

According to the illustrated example, further processing of this product results in the rule ignoring what Paper Weight is selected, allowing a performance improvement to stop checking this rule as the Paper Weight attribute is selected. As a result, because the rule has evaluated Quantity and Lamination, the engine also detaches from caring about those attributes, and the engine eliminated any possible values of Color the engine can detach from the final attribute the example engine is concerned with, preventing the need to re-evaluate the rule at all again.

When there are multiple rules the process of the rule being concerned with an attribute, detaching from it enables efficient processing based on not necessitating a revisit to any completed rules as part of an iteration, thereby being very computationally efficient and, thus, saving processor resources. Once the logical premises strike out a portion of a rule, those portions do not need to be revisited.

Continuing within the context set above and adding a new example rule of: If Lamination is Satin, for example, results in a Quantity of 1000. This example rule uses the language "must" instead of "cannot," which could be represented as cannot have any Quantity but 1000 (converting to "cannot be 500, 2500 or 5000") so the rule is represented in the engine as:

(Lamination=Satin) AND (Quantity!=1000)=false

The "must" as opposed to "cannot" results in a does not equal instead of an equals in the logical equation.

According to the illustrated example, by using both rules, and the selection of Lamination to be Satin, the initial list of possible attributes becomes:

Lamination [~~Matte~~, ~~Glossy~~, Satin]
Color [Red, White, Blue]
Paper Weight [250 gsm, 300 gsm, 350 gsm]
Quantity [500, 1000, 2500, 5000]

Because both rules are interested in changes to Lamination, for example, the first rule is checked first ((Lamination=Matte OR Lamination=Satin) AND
        (Color=White OR Color=Blue)) AND ((Paper
        Weight=300 gsm OR Paper Weight=350 gsm)
        OR (Quantity=500 OR Quantity=1000))=false ((~~Lamination=Matte~~ OR true) AND
        (Color=White OR Color=Blue) AND ((Paper
        Weight=300 gsm OR Paper Weight=350 gsm)
        OR (Quantity=500 OR Quantity=1000))=false (~~true AND~~ (Color=White OR Color=Blue)) AND
        ((Paper Weight=300 gsm OR Paper Weight=350
        gsm) OR (Quantity=500 OR Quantity=1000))=
        false While the example engine is able to detach from listening to Lamination, in this example, the engine cannot make any other assumptions at this point, so the second rule processes:

(Lamination=Satin) AND (Quantity!=1000)=false
        ~~(true) AND~~ (Quantity!=1000)=false In some examples, a way to satisfy that equation is to ensure that there are no options for Quantity that are not 1000. Quantity [~~500~~, 1000, ~~2500~~, ~~5000~~]

(Quantity!=1000)=false (false)=false

In this example, the rule is now fully satisfied as false=false, with possible values ensuring the rule cannot be violated unless possible values become empty. Accordingly, because Quantity's possible attributes were updated, and the first rule is interested in Quantity, the rule gets checked again where the engine left off processing the rule:

(Color=White OR Color=Blue) AND ((Paper
        Weight=300 gsm OR Paper Weight=350 gsm)
        OR (Quantity=500 OR Quantity=1000))=false (Color=White OR Color=Blue) AND ((Paper
        Weight=300 gsm OR Paper Weight=350 gsm)
        OR (~~false~~ OR true))=false Paper Weight can be removed from the rule at this point, as the Paper Weight logical expression is OR'd with a true.

(Color=White OR Color=Blue) AND
        (~~(Paper Weight=300gsm OR~~
        ~~Paper Weight=350gsm) OR~~ true)=
        false (Color=White OR Color=Blue) ~~AND (true~~ =false In this example, utilizing the logic that anything AND'd with true will be itself, and anything OR'd with true is true, this rule can further update the Color attribute. Color [Red, White, Blue] is enforced by this rule, resulting in both rules having been activated and remaining attributes being:

Lamination [~~Matte~~, ~~Glossy~~, Satin]
Color [Red, ~~White~~, ~~Blue~~]
Paper Weight [250 gsm, 300 gsm, 350 gsm]
Quantity [[~~500~~, 1000, ~~2500~~, ~~5000~~]

In this example, by only selecting Satin, both Red and Quantity 1000 can be inferred by the rule enforcement. As a result, Paper Weight, while initially being a factor to one of the rules, is uninfluenced by the current selection.

The examples described below relates to additional example attribute types. Attributes have been defined as having a set list of possible values, predefined, but the definitions of those possible values do not need to be explicitly enumerated. The possible value list contains the logic to annotate values as being assigned by selection, or as being eliminated by rule evaluation, and inform an engine if no possible values are left. In the previous example, Quantity was defined as Quantity [500, 1000, 2500, 5000], and if the possible values are expanded as whole numbers 500 to 5000, a large set of values would have to be enumerated, and in the case of non-whole numbers the set would be infinite. Using the text "500-5000#1" to represent 500 to 5000, increment of 1, Quantity can be defined as Quantity [500-5000#1].

For example, when the rule evaluation is: (Quantity!=1000)=false, the attribute list can be refined, and the engine is attempting to "remove all values that do not include 1000" from the valid list. The attribute list can necessitate ensuring that the cascade of human readable values, "Numbers from 500 to 5000 in increments of 1, removing all values that do not include 1000" is preserved. The original representation could be split into Quantity[500-999#1, 1000, 1001-5000#5] and then that all values but 1000 can be eliminated. For the purposes of this example, this Quantity will be represented as [500 5000#1, 1000], but important to understand that 1000 was not added to the list of valid values. If the rule was attempting to eliminate all values that are not equal to 6000, there is a need to eliminate all values, because 6000 was not in the original set, for example.

In some examples, additional types of attribute value representations can be created and the same principles apply, replacing aspects of the statements with equations, formulas, or functions (locally resolvable or that call to external resources), all logically preserve the statements that built the value set. As a result, a Quantity attribute can be defined/generated that calls to an inventory function, "Quantity must be a whole number, greater than 500, less than 5000, and less than the result of the inventory call" rule results might further use functions that may be lambda-style evaluated as the functions are capable, for example, such that "If Lamination is Glossy or Satin, Quantity must not be greater than the result of an LaminationInventoryFunction call that takes in the Lamination value". In this example, both attribute values and rules can be defined that are functional. If the attribute definition relies on other attributes, then a rule can be created, in some examples.

In this example, it will be checked against a paper inventory function and a lamination inventory function. The Quantity would be defined as Quantity[500-paperInv( )#1] with a rule of:

(Lamination=Glossy OR Lamination=Satin) AND
(Quantity>laminationInv(Lamination))=false Note that Quantity is limited to less than or equal to the lamination inventory for the given lamination, but because the logical equation is false driven, there is a need to use Quantity greater than the result of that call.

Provided with a selection of Glossy, first with any functions can be evaluated in the attributes that can be evaluated. If the paperInv( ) result has a value of 5000, which would result in Quantity [500-5000#1].

As a result, the rule will evaluate:

(true ~~OR Lamination=Satin~~) AND
(Quantity>laminationInv(Lamination))=false

Accordingly, any values of Quantity that are greater than laminationInv(Lamination) can be eliminated, and there is the value for Lamination (e.g., if this function used an attribute that could not yet be evaluated, the rule would still be listening for that attribute) in which a call can be made to laminationInv(Glossy) and eliminate any value of Quantity that are greater than the result. If the aforementioned result is equivalent to a value of 2000, the resulting Quantity would be [~~500-5000#1~~, 500-2000#1], for example. In some examples, these functions are checked to determine whether the functions can evaluate in the same manner that any part of a rule is checked, such that if the attributes required for evaluation have been sufficiently narrowed to be able to evaluate.

Representations such as "*" to represent any value, or regexes, or external API calls can all be used in place of a discrete value, for example.

The example below relates to mapping attributes to other attributes. In some examples, attributes can also be specified as being mapped to other attributes. In some such examples, the platform implementation often maps tenant attributes to Platform Standard attributes, but any type of attribute mapping can be implemented instead. Continuing the example as defined:

Attributes—
   Lamination [Matte, Glossy, Satin]
   Color [Red, White, Blue]
   Paper Weight [250 gsm, 300 gsm, 350 gsm]
   Quantity [500-5000#1]
Rules—

((Lamination=Matte OR Lamination=Satin) AND
(Color=White OR Color=Blue)) AND ((Paper
Weight=300 gsm OR Paper Weight=350 gsm)
OR (Quantity=500 OR Quantity=1000))=false (Lamination==Satin) AND (Quantity!=1000)=false By adding the attribute of Size [A3, A4, A5] mapped to numeric attributes Width [*] and Height [*], with the mappings as Size [A3 (29.7, 42.0), A4 (21.0, 29.7), A5 (14.8, 21.0)], the attributes of Width and Height, despite being mapped to by Size, can be treated like any attribute, the mapping from Size, in effect, defines an additional rule to be processed like any other rule, for performance reasons, this rule can be at the top of referenced list from the attributes in some examples.

(Size=A3 AND (Width!=29.7 OR Height!=42.0))
OR (Size=A4 AND (Width!=21.0 OR
Height!=29.7)) OR (Size=A5 AND
(Width!=14.8 OR Height!=21.0))=false In some examples, there is an analysis that treats and/or weights Width and Height differently, even though in the example provided Width and Height were initially identified as Width[*] and Height[*], it is known that the valid values for Width and Height are attributes that are in the mapped list from Size, because a Width of 10.0 was selected, although it satisfies *, an engine would eliminate all Size possibilities. In some examples, the optimization is best represented by limiting the choices for mapped attributes to values that are mapped to, or allowing selections from the mapping attribute, not the mapped to attribute.

If a Size is specified, such as, for example, A4, the rule would process as shown in the example below:

(false ~~AND (Width!=29.7~~
  ~~OR Height !=42.0~~)) OR (true AND
  (Width!=21.0 OR Height!=29.7)) OR (false
  ~~AND (Width!=14.8~~
  ~~OR Height !=21.0~~)=false
  ~~false OR~~ (Width!=21.0 OR Height !=29.7)
  OR ~~false~~ =false In order to satisfy the rule at this point, the selection of A4 will force Width and Height to invalidate all values except for 21.0 and 29.7, respectively, for example. Alternatively, if either Width or Height are specified the rule can process, for example if 29.7 was specified as a Width:

(Size=A3 AND (Width!=29.7 OR Height!=42.0))
  OR (Size=A4 AND (Width!=21.0 OR
  Height!=29.7)) OR (Size=A5 AND
  (Width!=14.8 OR Height!=21.0))=false (Size=A3 AND (~~false OR~~ Height!=42.0)) OR
  (Size=A4 AND (true ~~OR Height !=29.7~~))
  OR (Size=A5 AND (true OR Height
  ~~OR Height !=21.0~~))=false (Size=A3 AND Height!=42.0) OR (Size=A4
  ~~AND true~~) OR (Size=A5
  ~~AND true~~)=false (Size=A3 AND Height!=42.0) OR (Size=A4) OR
  (Size=A5)=false In some examples, because all three Size portions of the equation are OR'd together and need to equate to false, each logical expression needs to be false, meaning A4 and A5 can be eliminated as possible values Size [A3, A4, ~~A5~~]. This would force Size to A3:

(~~true AND~~ Height!=42.0) OR ~~(false) OR~~
  ~~(false)~~ =false (Height!=42.0)=false Accordingly, Height [42] is updated. Thus, by selecting Size, all mapped attributes can be determined, and if selecting a mapped attribute, the mapping attribute can be limited.

In some examples, additional rules can be added to either the mapping attribute or attributes that are mapped to. Using the existing example and adding an example rule that when Width>20.0, then Lamination cannot be Glossy or Satin.

(Width<=20.0) AND (Lamination=Glossy OR
  Lamination==Satin)=false

This example rule combines with the attribute mapping rules, and existing rules, to cascade selections for attributes.

The examples below describe example tenant mapping that may be implemented in examples disclosed herein.

According to the illustrated example, the attributes supported have been represented as the name of the attribute, but there can be other metadata associated with those attributes, and, for equivalency, namespacing those attributes can be implemented for ease of grouping, for example. In particular, the namespacing can be helpful to illustrate how tenant language mapping can be accomplished in examples disclosed herein.

For the example, attributes to be namespaced can be updated:

Attributes—
platform.Lamination [Matte, Glossy, Satin]
platform.Color [Red, White, Blue]
platform.Paper Weight [250 gsm, 300 gsm, 350 gsm]
platform.Quantity [500-5000#1]
platform.Width [*]
platform.Height [*]
tenantA.Size(platform.Width, platform.Height) [A3 (29.7, 42.0), A4 (21.0, 29.7), A5 (14.8, 21.0)]
Rules—

> ((platform.Lamination=Matte OR platform.
> Lamination=Satin) AND (platform.Color=White
> OR platform.Color=Blue)) AND ((platform.Paper Weight=300 gsm OR platform.Paper
> Weight=350 gsm) OR (platform.Quantity=500
> OR platform.Quantity=1000))=false
> (platform.Lamination=Satin) AND (platform.Quantity!=1000)=false Attribute Mapping Rules—

> (tenantA.Size=A3 AND (platform.Width!=29.7 OR
> platform.Height!=42.0)) OR (tenantA.Size=A4
> AND (platform.Width!=21.0 OR platform-
> .Height!=29.7)) OR (tenantA.Size=A5 AND
> (platform.Width!=14.8 OR platform.
> Height!=21.0))=false Tenant language mapping uses attribute mapping to traverse tenant languages, so if TenantB creates attribute mappings of their own:

> tenantB.Paper(platform.Lamination, platform.Width,
> platform.Height) [Paper1(Glossy, 29.7, 42.0),
> Paper2(Satin, 14.8, 21.0), Paper3(Matte, 21.0,
> 21.0), Paper4(Glossy, 10.0, 10.0)] tenantB.
> Shade(platform.Color) [None(White), Blueish
> (Blue)]

These example tenant mappings create the basis for converting between the tenantA product and the manner in which tenantB views or sees the product. In some examples, the attributes and rules that are created from the tenantB mapping are merged with the rules and attributes from tenantA, and even though the tenantA attribute of Size is not used by tenantB, tenantA's attributes are processed in the engine for compatibility. In some examples, the optimization discussed in connection with attribute mapping can be used when Size is not exposed as a choice, but is still used by the engine, as well as the optimization to reduce attributes to values that are mapped to.

When the two tenant attributes utilize (e.g., optimize) a common platform standard attribute, any platform standard attribute value not available in both can be removed, and any tenant attribute value that maps to a platform standard attribute value that is optimized, is also optimized, for example.

For example, Width is optimized down from star to [29.7, 21, 14.8], because 10.0 would be allowed in Width from tenantB Paper, but not from tenantA. Size, the attribute value in tenantB Paper that maps to 10 is also optimized away. Additionally, when Height is optimized down to [42.0, 21.0] because 29.7 is not a Height in tenantB Paper, then tenantA Size A4 is removed, and 21.0 is no longer a valid Width in tenantA. Further, Size is removed from platform Width, and tenantB Paper's Paper3 value is invalidated. With Paper3 invalidated, Matte no longer has a mapping in platform. Lamination is, thus, removed in this example.

Accordingly to examples disclosed herein, this example optimization process can proceed similar to rule processing, moving through a list of mapping attributes (tenant), and updating mapped attributes (platform standard), and queuing back mapping attributes if the updated attribute was also referenced by them.

Merged and optimized attributes:
platform.Lamination [Matte, Glossy, Satin]—Hidden from selection due to tenantB.Paper
platform.Color [Red, White, Blue]—Optimized and hidden due to tenantB.Shade
platform.Paper Weight [250 gsm, 300 gsm, 350 gsm]
platform.Quantity [500-5000#1]
platform.Width [*, 29.7, 21.0, 14.8, 10.0]—Optimized and Hidden from selection
platform.Height [*, 42.0, 29.7, 21.0]—Optimized and Hidden from selection
tenantA.Size(platform.Width, platform.Height) [A3 (29.7, 42.0), A4 (21.0, 29.7), A5 (14.8, 21.0)]
tenantB.Paper(platform.Lamination, platform.Width, platform.Height) [Paper1(Glossy, 29.7, 42.0), Paper2(Satin, 14.8, 21.0), ~~Paper3(Matte, 21.0, 21.0)~~, ~~Paper4(Glossy, 10.0, 10.0)~~ ]
tenantB.Shade(platform.Color) [None(White), Blueish (Blue)]

Rules are also merged (in this case, tenantB does not have any rules, but they are simply added to the list) and mapping rules are created for the optimized set.

Rules—

> ((platform.Lamination=Matte OR platform.
> Lamination=Satin) AND (platform.Color=White
> OR platform.Color=Blue)) AND ((platform.Paper Weight=300 gsm OR platform.Paper
> Weight=350 gsm) OR (platform.Quantity=500
> OR platform.Quantity=1000))=false > (platform.Lamination=Satin) AND (platform.Quantity!=1000)=false Updated and Merged Attribute Mapping Rules—

> (tenantA.Size=A3 AND (platform. Width!=29.7 OR
> platform. Height!=42.0)) OR (tenantA. Size=A5
> AND (platform.Width!=14.8 OR platform.
> Height!=21.0))=false > (tenantB.Paper=Paper1 AND
> (platform.Lamination!=Glossy OR platform.Width!=29.7 OR platform.Height!=42.0))
> OR (tenantB.Paper==Paper2 AND
> (platform.Lamination!=Satin OR platform.
> Width!=14.8 OR platform.Height!=21.0))=false The TenantB view of the product exposes the platform standard namespaced and TenantB namespaced attributes, and values the view can map for them.

platform.Paper Weight [250 gsm, 300 gsm, 350 gsm]
platform.Quantity [500-5000#1]
tenantB Paper(platform.Lamination, platform.Width, platform.Height) [Paper1(Glossy, 29.7, 42.0), Paper2(Satin, 14.8, 21.0)]
tenantB Shade(platform.Color) [None(White), Blueish (Blue)]

In this example, rule processing will allow valid selections as specified from TenantA, so a selection of Paper2 will still invoke the rule that doesn't allow Satin, with White and Blue to be on 300 gsm or 350 gsm paper or Quantity of 500 or 1000.

FIGS. 6A-6D illustrate example rules execution that may be implemented in examples disclosed herein. In particular, the rules execution depicted in FIGS. 6A-6D may be implemented by the rules executor 115. FIG. 6A depicts an initial state while FIG. 6B depicts provided selections. FIG. 6C depicts a first processed item and FIG. 6D represents a remaining state in which there are no more associated rules to be executed.

Based on the example of FIGS. 6A-6D, attribute definitions are about specifying possible values for an attribute, rule specification and evaluation are about identifying incompatible or invalid attribute value combinations.

The system for processing these rules is performed and provides feedback about attribute selection, thereby allowing partially specified or configured attributes to be validated, returning remaining attribute values.

To accomplish this, examples disclosed herein build a run list of attributes with their possible values, as well as a reference object of the specified rules, linking each rule to attributes that are part of the rule evaluation. If an attribute value is specified as part of the evaluation, the object in the run list associated with that attribute has possible values reduced to the specified value.

According to the illustrated example, as the list is processed, each attribute will call to each rule that references the attribute to see if that rule has enough facts to perform an exclusion. If the rule does, the exclusion is performed, and any attributes that have possible values excluded as a result are re-added to the attribute run list, and the rule can be ignored on further processing. If the exclusion causes an attribute to have no valid values remaining, the specified attribute values are invalid. In contrast, if the run list completes with every attribute having a single possible value, the specified attributes are valid and complete. If there are attributes with multiple possible values, the user may be required to specify additional attribute values.

According to the illustrated example, in a tenant definition having attribute AX specified as having possible values of AX1 and AX2, as well as attribute AY specified as having possible values of AY1 and AY2 and attribute AZ having possible values of AZ1 and AZ2. A product is defined having all of these attribute values and a rule saying AX1 excludes AY2.

If a user specifies this product with Attribute AX being AX1, the example engine will eliminate AY2, leaving AY1 as a possible value for attribute AY—the user will still need to specify a value for attribute AZ. Shown below is example pseudo-code for a rules execution engine and/or rules engine, such as the example rules executor 115, for example:

```
// Seed runList and ruleReference from the product definition
runList = productDefinition.attributeList;
ruleReference = productDefinition.ruleList;
evaluate (selectedAttributes) {
    // Set all selected values as only remaining possible value in runList
    forEach(selectedAttributes->selectedAttribute) {
        runList[selectedAttribute.key].removePossibleValuesNotIn(
            selectedAttribute.value);
    }
    // Step through the attribute runlist
    forEach(runList->attribute) {
        forEach(ruleReference->rule) {
            // Check each rule to see if the rule uses this attribute
            if(rule.usesAttribute(attribute)) {
                if(rule.canActivate) {
                    // If the rule uses the attribute,
                    // activate the rule and remove the rule from being checked
                    activateRule(rule);
                    ruleReference.removeRule(rule);
                }
            }
        }
    }
    isValid = true;
    isComplete = true;
    forEach(runList->attribute) {
        if(attribute.possibleValues.length == 0) {
            // If any attributes have no possible values - is invalid
            isValid =false;
        } else if (attribute.possibleValues.length > 1) {
            // If any attributes have multiple possible values - is incomplete
            isComplete = false;
        }
    }
}
activateRule(rule) {
    forEach(rule.component->component) {
        if (component.notSatisfied) {
            // For the portion of the rule that is not yet satisfied,
            // ensure possible attribute values cannot be allowed to break it
            runList[component.attribute.key].removePossibleValuesNotIn (
                component.attribute.values)
        }
    }
}
```

In contrast to a RETE system in which a tree of rules is built to be traversed, this example system operates on the basis that querying a rule to see if the rule has enough information to perform any actions is a relatively costless operation in comparison to the action taken by that rule. Once an attribute has had its potential values updated then any rule based on that attribute can be marked as "dirty" to check if sufficient information has been provided. This allows the processing of the rules to naturally occur in an efficient order as no cost will be incurred to evaluate a rule more than once, nor evaluate a rule before enough facts to act on that rule have been gathered.

In this example, the actions the rules take are all exclusion based, thereby reducing a set of possibilities, so when all or most invalid options have been eliminated as a possibility, the rule can be satisfied, as any further reductions would either leave the rule satisfied, or remove all possibilities, which would leave the whole evaluation as invalid. As a result, with this safe satisfaction of a rule there is no need to revisit the rule, improving performance.

While any individual rule needs to know if it can act based on current facts, basic mutually exclusive rules can operate under logical principles and assumptions, for example. Accordingly, any condition of a rule can be AND'd together, and all of those conditions being AND'd with all of the results OR'd together. The exclusion nature of rules and the "cannot" language means that a rule will enforce the logical equation to always be false.

For example, a rule stating:

If Ax AND Bx THEN you cannot have Cx OR Dx can be built into the logical rule:

Ax AND Bx AND (Cx OR Dx)=FALSE

The example engine can make assumptions based on partial conditions to satisfy that formula, for example. If the rule knows 2 of the 3 "Ax", "Bx", "Cx OR Dx," the engine can assume the third is False and enforce that by removing any possibility that would make the third True. This determination can be accomplished by looking at the number of components, or logically AND'd conditions, and determining if one less than that are evaluated to be true. If any are evaluated to false, for example, the engine can safely assume the result of the other attributes will no longer matter and can remove the rule from processing.

In enabling a two-sided marketplace platform, it can be advantageous for buyers to be able to purchase sellers' products as if they were their own. This enables purchases to be relatively frictionless and often easily exposes additional manufacturing capacity when the buyer cannot manufacture their own product with sufficient quantities or costs. To accomplish this, a buyer can define one or more 3rd party sellers' products as equivalent to their own product. In this example, an equivalency evaluator returns mappings supplied by a seller or buyer as to which products are deemed equivalent, even if those products were defined using different tenant definitions (and subsequently have differently defined attributes).

Figure 7:
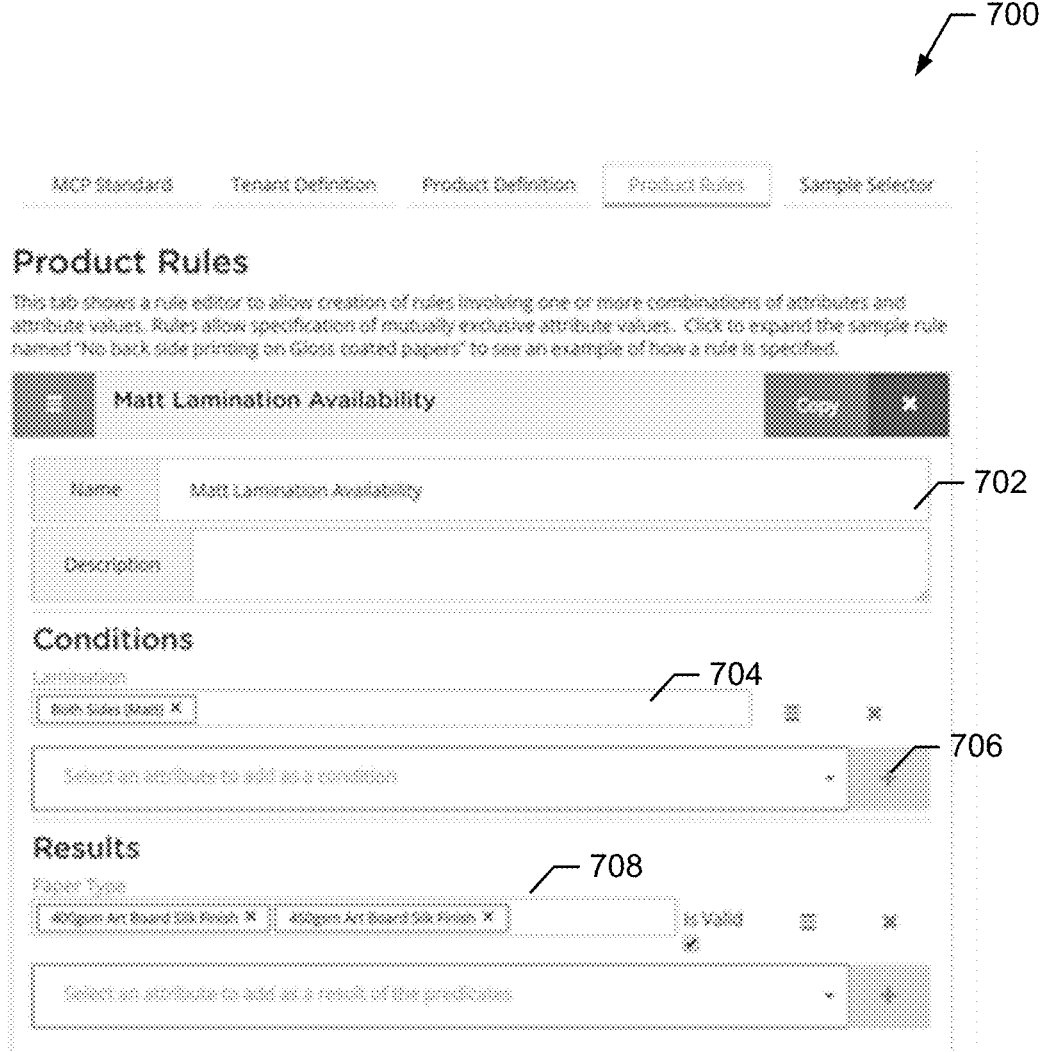
FIG. 7 illustrates an example user interface that may be implemented with examples disclosed herein.

FIG. 7 illustrates an example user interface 700 that may be implemented in examples disclosed herein. As can be seen in the illustrated example interface 700 shown in FIG. 7, a rule identification field 702, a condition list 704, a condition input 706 and a results area 708 are shown. As a result, a user can efficiently define rules and/or rule pattern generation to be verified by the rules executor 115.

According to the illustrated example, the user interface 700 illustrates how a user can build a rule that indicates when "Both Sides (Matt)" are chosen as a value for the attribute of "Lamination", the only permissible choices for values of the "Paper Type" attribute are "400 gsm Art Board Silk Finish" or "450 gsm Art Board Silk Finish". This example rule defining mechanism can be extended for any number of attributes as "conditions" as well as producing any number of restricted attributes under "Results".

Figure 8:
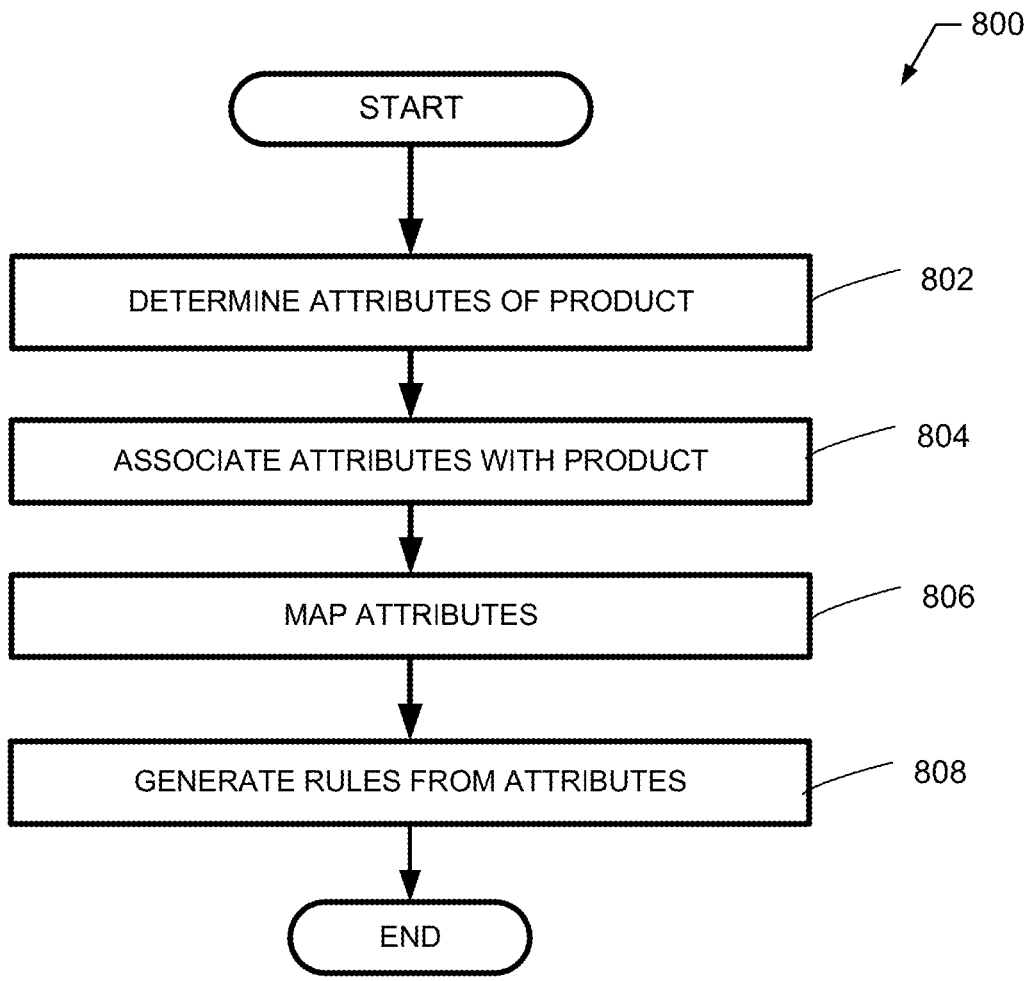
FIG. 8 is a flowchart representative of machine readable instructions that may be executed to perform automated configuration identification.

Turning to FIG. 8, an example method 800 that may be implemented in examples disclosed herein is shown. In particular, the example method 800 may be implemented by the example rules extractor 112 and/or the product attribute translator 116 to automatically generate product attributes and/or product attribute definitions (e.g., automated SKU mapping).

Product attributes are determined by the example product attribute translator 116 (block 802).

In this example, the product attribute translator 116 associates attributes with a product offered by at least one tenant (block 804). In some examples, the product attribute translator 116 defines attributes and/or designators of the product, which is does not include unique attributes (e.g., a SKU that does not indicate configurable options).

The example product attribute translator 116 maps the associated attributes (block 806). In particular, the product attribute translator 116 maps the associated product attributes to another tenant and/or a platform standard definition, in some examples.

In some examples, the rules extractor 112 of the illustrated example generates rules based on the associated attributes (block 808) and the process ends.

An example implementation of the method 800 of FIG. 8 is described below. Many tenants will register large sets of fixed configuration product identifiers, which again, represent products as fixed configurations of product attributes. For example, a tenant may register a polo shirt with identifier 123, as having attributes of Color: Red, and Size: L, and another with identifier 345, as having attributes of Color: Blue and Size: L, and so on and so forth. However, others may want to access these products as a single family or identifier, P, that simply takes attributes of Color and Size as variable values that are specified when the product is ordered. This can be easily facilitated by adding an additional variable attribute of "MappedSKU" to an existing tenant definition with rules as noted below in the following example:

Nike Polo (reference ID:6253)
Attributes: (autogenerated from fixed configuration identifiers)
   Color: [Red, Blue]
   Size: [L, XL]
   MappedSKU: [123, 345, 789]
Rules: (autogenerated from fixed configuration identifiers)
   If (Red) then all MappedSKUs but 123 invalid
   If (Blue) then all MappedSKUs but 345 and 789 invalid
   If (L) then all MappedSKUs but 123 and 345 invalid
   If (XL) then all MappedSKUs but 789 invalid As a result, in this example, a product stored at reference ID:6253, which implements Nike Polo family as a variably configured product identifier, can be accessed, where a combination of attributes is valid if an engine precipitates a single value for MappedSKU. In some examples, MappedSKU may be a special or hidden attribute used for the purpose of this validation. For example, using a rules execution engine and a sample selector, Color:Red can be selected, and the only choices available for Size will be "L".

This potentially provides product catalogs or other external user interfaces the ability to display and access products consistently as variably configured products regardless of how the products were registered. Accordingly, in some examples, the consumer no longer needs to be concerned if products are registered with many IDs. This also simplifies entries to the equivalency evaluator in that only a single identifier needs to be specified and processed (versus potentially many hundreds or thousands of IDs based on the originally registered products).

Further, ordering may be implemented as shown in the following example. Continuing to use the "Nike Polo" as an example, an example approach is proposed to support orderability at product family level (ordering Nike Polo in Color: Red, Size: L) by making an enhancement to the service that receives orders. Currently this service may have a simple table to allow mapping one ID to a different ID, the change is noted in the example table below.

| | |
|---|---|
| VIP-123, width: 10 | 57 |
| | 23 |
| 6253 | MappedSKUEvaluator( ) |

In this example, MappedSKUEvaluator calls to the rules execution engine with the 6253 reference ID and supplies any provided variable attributes along with that reference ID (Red and L using the current example). If an engine returns with a single value for MappedSKU, it returns that as the aliased identifier that can be ordered, for example.

Figure 9:
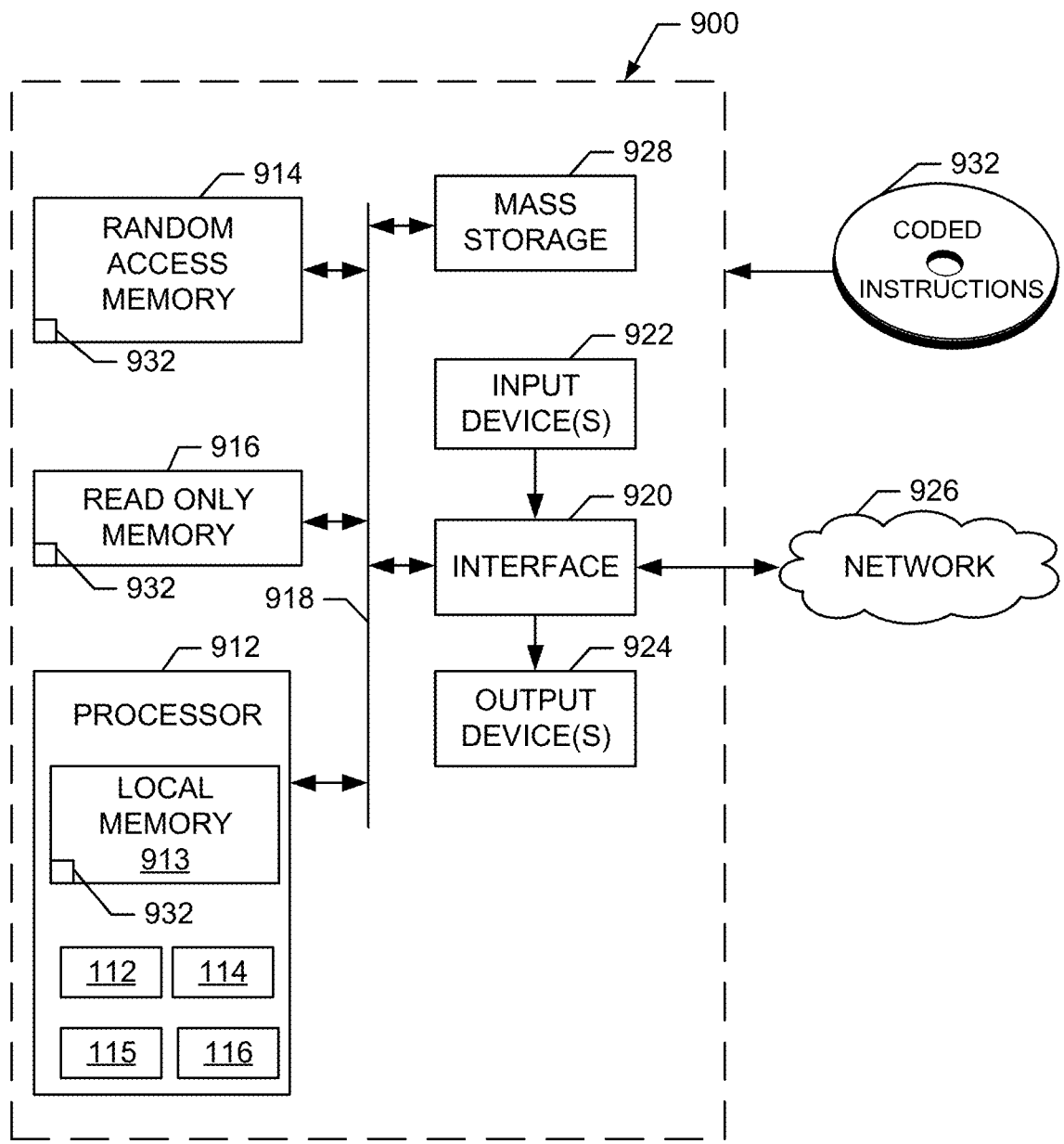
FIG. 9 is a block diagram of an example processing platform structured to execute the instructions of FIGS. 2, 3, 5 and/or 8 to implement example product data management system.

An example order is shown below.
Input (ordered ID w/ attribute values): 6253, Color:Red, Size:L
Output (new ID to be used for order): 123 (the ID present in MappedSKU FIG. 9 is a block diagram of an example processor platform 900 structured to execute the instructions of FIGS. 2, 3, 5 and 8 to implement the product data management system 100 of FIG. 1. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example rules extractor 112, the example equivalency calculator 114, the example rules executor 115 and the example attribute translator 116.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIGS. 2, 3, 5 and 8 may be stored in the mass storage device 928, in the volatile memory 914, in the non-volatile memory 916, and/or on a removable non-transitory computer readable storage medium such as a CD or DVD.

From the foregoing, it will be appreciated that example methods and apparatus have been disclosed that provide effective translation and management of product data, such as product attributes. Examples disclosed herein enable conversion of tenant-specific attributes and/or identifiers to platform standard attributes and/or attribute languages. Examples disclosed herein also enable generation of product identifiers (e.g., product attribute identifiers) of products that are not identified by configurations or features. The disclosed methods, apparatus and articles of manufacture are accordingly directed to one or more improvement(s) in the functioning of a computer by enabling computationally efficient translation of attributes according to tenant-specific rules.

Example 1 includes a system for translating and managing product data pertaining to a plurality of tenants. The system includes a rules executor to verify, based on product attribute rules, that requested product attributes pertaining to a product request from a buyer are valid, an attribute translator to generate platform standard attributes of products corresponding to the tenants, where the attribute translator is to translate tenant-specific product attributes to the platform standard attributes based on the tenant-specific product attributes and the product attribute rules, and an equivalency evaluator to an equivalency of the products based on the requested product attributes and the platform standard attributes. The equivalency evaluator is to store the equivalency.

Example 2 includes the system of Example 1, and further includes a rules extractor to generate the product attribute rules based on product attributes.

Example 3 includes the system of Example 2, where the product attribute rules are generated based on mappings between different ones of the tenants.

Example 4 includes the system of Example 1, and further includes a marketplace to process a purchase request by the buyer based on the evaluated equivalency.

Example 5 includes the system of Example 1, where the product attribute rules are manually entered.

Example 6 includes the system of Example 1, where the platform standard attributes are generated based on product attributes of a first tenant of the tenants.

Example 7 includes the system of Example 1, where the platform standard attributes are generated by mapping attributes between different ones of the tenants.

Example 8 includes a method. The method includes verifying, by executing instructions with a processor, that a product request from a buyer is valid based on product attribute rules, where the product request includes requested product attributes, generating, by executing instructions with the processor, platform standard attributes pertaining to product attributes of products offered by tenants based on tenant-specific product attributes and the product attribute rules, evaluating, by executing instructions with the processor, an equivalency of products offered by the tenants based on the requested product attributes and the platform standard attributes, and storing the equivalency of the products offered by the tenants.

Example 9 includes the method of Example 8, and further includes generating, by executing instructions with the processor, the product attribute rules based on product attributes.

Example 10 includes the method of Example 9, where the product attribute rules are generated based on mapped attributes between different ones of the tenants.

Example 11 includes the method of Example 8, and further includes receiving, by executing instructions with the processor, the product attribute rules from user input.

Example 12 includes the method of Example 8, and further includes processing a purchase request by the buyer based on the evaluated equivalency.

Example 13 includes the method of Example 8, where generating the platform standard attributes is based on product attributes of a first tenant of the tenants.

Example 14 includes the method of Example 8, where generating the platform standard attributes includes defining translations of the product attributes.

Example 15 includes the method of Example 8, where the platform standard attributes are generated by mapping attributes between different tenants of the tenants.

Example 16 includes a tangible machine readable medium comprising instructions, which when executed, cause a processor to at least verify that a product request associated with a buyer is valid based on product attribute rules, where the product request includes requested product attributes, generate platform standard attributes pertaining to product attributes of products sold by a plurality of tenants based on the tenant-specific product attributes and the product attribute rules, determine an equivalency of products offered by the tenants based on the requested product attributes and the platform standard attributes, and store the determined equivalency of the products offered by the tenants.

Example 17 includes the tangible machine readable medium of Example 16, where the instructions cause the processor to generate the product attribute rules based on product attributes.

Example 18 includes the tangible machine readable medium of Example 17, where the product attribute rules are generated based on mapped attributes between different ones of the tenants.

Example 19 includes the tangible machine readable medium of Example 16, where the instructions cause the processor to process a purchase request by the buyer based on the evaluated equivalency.

Example 20 includes the tangible machine readable medium of Example 16, where the product attribute rules are based on user input.

Example 21 includes the tangible machine readable medium of Example 16, where generation of the platform standard attributes is based on product attributes of a first tenant of the tenants.

Example 22 includes the tangible machine readable medium of Example 16, where generation of the platform standard attributes includes defining translations of the product attributes.

Example 23 includes the tangible machine readable medium of Example 16, where the platform standard attributes are generated by mapping attributes between different tenants of the tenants.

This application claims the benefit under 35 U.S.C. § 119(e) to U.S. Provisional Application No. 62/617,501 titled "METHODS AND APPARATUS TO TRANSLATE AND MANAGE PRODUCT DATA, which was filed on Jan. 15, 2018. The foregoing U.S. Application is hereby incorporated herein by reference in its entirety.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A system for translating and managing product data pertaining to a plurality of tenants, the system comprising at least one processor to:
   generate, by a rules extractor, a set of product attribute rules corresponding to one or more logical equations;
   evaluate, by a rules executor, ones of the set of product attribute rules based on requested product attributes;
   cause, by the rules executor, exclusion of the ones of the set of product attribute rules in response to the evaluation;
   verify, by the rules executor, that a combination of the requested product attributes pertaining to a first product request from a buyer is valid based on the set of product attribute rules;
   in response to determining the combination of the requested product attributes is invalid, direct, by an interface, the buyer to provide a second product request different from the first product request;
   generate, by an attribute translator, a list of the requested product attributes and attribute values corresponding to the requested product attributes;
   generate, by the attribute translator, platform standard attributes of products corresponding to the tenants, wherein the attribute translator is to translate tenant-specific product attributes to the platform standard attributes based on the tenant-specific product attributes and the set of product attribute rules;
   evaluate, by an equivalency evaluator, an equivalency of the products based on the requested product attributes and the platform standard attributes;
   store, at a storage, the equivalency as a mapping for reference in determining product substitutions; and
   place, by the interface, an order based on the mapping, the order corresponding to the first product request when the combination of the requested product attributes is valid or the second product request when the combination of the requested product attributes is invalid.

2. The system as defined in claim 1, wherein the at least one processor is to generate the set of product attribute rules based on product attributes.

3. The system as defined in claim 1, wherein the set of product attribute rules is generated based on mappings between different ones of the tenants.

4. The system as defined in claim 1, further including a marketplace to process a purchase request by the buyer based on the evaluated equivalency.

5. The system as defined in claim 1, wherein the set of product attribute rules is manually entered.

6. The system as defined in claim 1, wherein the platform standard attributes are generated based on product attributes of a first tenant of the tenants.

7. The system as defined in claim 1, wherein the platform standard attributes are generated by mapping attributes between different ones of the tenants.

8. A method performed by executing instructions with at least one processor, the method comprising:
   generating, by a rules extractor, a set of product attribute rules corresponding to one or more logical equations;
   evaluating, by a rules executor, ones of the set of product attribute rules based on requested product attributes;

causing, by the rules executor, exclusion of the ones of the set of product attribute rules in response to the evaluation;

verifying, by the rules executor, that a first product request from a buyer is valid based on the set of product attribute rules, wherein the product request includes the requested product attributes;

directing, by an interface in response to determining the combination of the requested product attributes is invalid, the buyer to provide a second product request different from the first product request;

generating, by an attribute translator, platform standard attributes pertaining to product attributes of products offered by tenants based on tenant-specific product attributes and the set of product attribute rules;

evaluating, by an equivalency evaluator, an equivalency of products offered by the tenants based on the requested product attributes and the platform standard attributes;

storing, at a storage, the equivalency of the products offered by the tenants as a mapping for reference in determining product substitutions; and placing, by the interface, an order based on the mapping, the order corresponding to the first product request when the combination of the requested product attributes is valid or the second product request when the combination of the requested product attributes is invalid.

9. The method as defined in claim 8, wherein the set of product attribute rules is generated based on product attributes.

10. The method as defined in claim 8, wherein the set of product attribute rules is generated based on mapped attributes between different ones of the tenants.

11. The method as defined in claim 8, further including receiving, by the interface, the set of product attribute rules from user input.

12. The method as defined in claim 8, further including processing, by a marketplace, a purchase request by the buyer based on the evaluated equivalency.

13. The method as defined in claim 8, wherein generating the platform standard attributes is based on product attributes of a first tenant of the tenants.

14. The method as defined in claim 8, wherein generating the platform standard attributes includes defining translations of the product attributes.

15. The method as defined in claim 8, wherein the platform standard attributes are generated by mapping attributes between different tenants of the tenants.

16. A non-transitory computer readable medium comprising instructions, which when executed, cause at least one processor to at least:

generate, by a rules extractor, a set of product attribute rules corresponding to one or more logical equations;

evaluate, by a rules executor, ones of the set of product attribute rules based on requested product attributes;

cause, by the rules executor, exclusion of the ones of the set of product attribute rules in response to the evaluation;

verify, by the rules executor, that a first product request associated with a buyer is valid based on the set of product attribute rules, wherein the product request includes the requested product attributes;

in response to determining the combination of the requested product attributes is invalid, direct, by an interface, the buyer to provide a second product request different from the first product request;

generate, by an attribute translator, platform standard attributes pertaining to product attributes of products sold by a plurality of tenants based on tenant-specific product attributes and the set of product attribute rules;

determine, by an equivalency evaluator, an equivalency of products offered by the tenants based on the requested product attributes and the platform standard attributes;

store, at a storage, the determined equivalency of the products offered by the tenants as a mapping for reference in determining product substitutions; and place, by the interface, an order based on the mapping, the order corresponding to the first product request when the combination of the requested product attributes is valid or the second product request when the combination of the requested product attributes is invalid.

17. The non-transitory computer readable medium as defined in claim 16, wherein the set of product attribute rules is generated based on product attributes.

18. The non-transitory computer readable medium as defined in claim 16, wherein the set of product attribute rules is generated based on mapped attributes between different ones of the tenants.

19. The non-transitory computer readable medium as defined in claim 16, wherein the instructions cause the at least one processor to process, by a marketplace, a purchase request by the buyer based on the evaluated equivalency.

20. The non-transitory computer readable medium as defined in claim 16, wherein the set of product attribute rules is based on user input.

21. The non-transitory computer readable medium as defined in claim 16, wherein generation of the platform standard attributes is based on product attributes of a first tenant of the tenants.

22. The non-transitory computer readable medium as defined in claim 16, wherein generation of the platform standard attributes includes defining translations of the product attributes.

23. The non-transitory computer readable medium as defined in claim 16, wherein the platform standard attributes are generated by mapping attributes between different tenants of the tenants.

24. The system of claim 1, wherein the evaluation of the ones of the set of product attribute rules results in reduction of a set of the attribute values corresponding to the requested product attributes.

25. The system of claim 1, wherein the at least one processor is to further query, by the rules executor, the set of product attribute rules based on the requested product attributes to select the ones of the set of product attribute rules.

26. The system of claim 1, wherein the at least one processor is to further determine, by the rules executor, that the combination of the requested product attributes is invalid in response to determining that at least one of the set of product attribute rules is not satisfied.

27. The system of claim 1, wherein the at least one processor is to further substitute a product based on the equivalency.

28. The system of claim 1, wherein a first product attribute rule from the ones of the set of product attributes rules includes a first condition and a second condition, the at least one processor to cause, by the rules executor, exclusion of the first attribute rule in response to the requested product attributes not satisfying at least one of the first condition or the second condition.

29. The system of claim 1, wherein the requested product attributes include a first requested product attribute and a second requested product attribute, and wherein the at least one processor is to, based on the product attribute rules, select, by the attribute translator, a first attribute value for the first requested product attribute in response to the second requested product attribute having a second attribute value.

30. The system of claim 1, wherein the order corresponds to a product having at least a threshold number of the requested product attributes.

31. The system of claim 1, wherein the attribute values are first attribute values, and wherein the order corresponds to a product having second attribute values, a difference between the first attribute values and the second attribute values being less than a threshold.

* * * * *